(12) United States Patent
Koyanagi et al.

(10) Patent No.: US 9,514,348 B2
(45) Date of Patent: Dec. 6, 2016

(54) IMAGE PROCESSING APPARATUS, IMAGE PROCESSING METHOD, AND COMPUTER READABLE MEDIUM

(71) Applicant: FUJI XEROX CO., LTD., Tokyo (JP)

(72) Inventors: Katsuya Koyanagi, Kanagawa (JP);
Shigeru Okada, Kanagawa (JP);
Minoru Sodeura, Kanagawa (JP);
Hiroyuki Kishimoto, Kanagawa (JP);
Shintaro Adachi, Kanagawa (JP);
Shinji Hanaoka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/635,516

(22) Filed: Mar. 2, 2015

(65) Prior Publication Data

US 2015/0261989 A1 Sep. 17, 2015

(30) Foreign Application Priority Data

Mar. 12, 2014 (JP) ................ 2014-048615

(51) Int. Cl.
*G06K 7/14* (2006.01)
*G06K 7/10* (2006.01)
*H04N 1/00* (2006.01)
*G06K 9/20* (2006.01)

(52) U.S. Cl.
CPC ......... *G06K 7/1443* (2013.01); *G06K 7/10722* (2013.01); *G06K 7/1439* (2013.01); *G06K 9/2063* (2013.01); *H04N 1/00* (2013.01)

(58) Field of Classification Search
USPC .. 235/462.16, 462.07, 462.1, 375; 705/14.25
See application file for complete search history.

(56) References Cited

U.S. PATENT DOCUMENTS

| 7,546,949 | B1 * | 6/2009 | Blanford | G06K 7/10 235/375 |
| 2013/0039537 | A1 * | 2/2013 | Yamazaki | G06T 11/00 382/103 |
| 2014/0053076 | A1 * | 2/2014 | Tang | H04L 67/025 715/740 |
| 2014/0279428 | A1 * | 9/2014 | Holman | G06Q 20/10 705/39 |
| 2014/0324563 | A1 * | 10/2014 | Wencel, II | G06Q 30/0226 705/14.27 |
| 2015/0241237 | A1 * | 8/2015 | Yoshida | G01C 21/3614 345/157 |

FOREIGN PATENT DOCUMENTS

| JP | H07-296099 A | 11/1995 |
| JP | 2007-304755 A | 11/2007 |
| JP | 2011-170430 A | 9/2011 |
| JP | 2012-085275 A | 4/2012 |
| JP | 2012-164123 A | 8/2012 |

\* cited by examiner

*Primary Examiner* — Allyson Trail
(74) *Attorney, Agent, or Firm* — Oliff PLC

(57) ABSTRACT

An image processing apparatus includes an acquisition unit, a determination unit, and a conversion unit. The acquisition unit acquires from a read image including a machine-readable code at least one of a position of the machine-readable code and character information included in the machine-readable code. The determination unit determines, based on the information acquired by the acquisition unit, a conversion method for a character code included in the machine-readable code. The conversion unit performs conversion of the character code in accordance with the conversion method determined by the determination unit.

6 Claims, 5 Drawing Sheets

FIG. 3

| QR CODE INFORMATION | | | | RECORDED CHARACTER CODE | OUTPUT CHARACTER CODE | PROGRAM INFORMATION |
|---|---|---|---|---|---|---|
| POSITION | ORIENTATION | TYPE | ... | | | |
| (x1, y1) | — | BINARY MODE | | UTF-8 | UTF-16 | prg1 |
| — | — | CHINESE CHARACTER MODE | | SHIFT-JIS | UTF-16 | prg2 |
| (x2, y2) | 10° | BINARY MODE | | BIG5 | ECU-JP | prg3 |
| (x2, y2) | — | BINARY MODE | | ECU-KR | ECU-JP | prg4 |
| — | 90° | — | — | UTF-8 | UTF-16 | prg1 |
| ... | | | | | | |

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2014-048615 filed Mar. 12, 2014.

BACKGROUND

Technical Field

The present invention relates to an image processing apparatus, an image processing method, and a computer readable medium.

SUMMARY

According to an aspect of the invention, there is provided an image processing apparatus including an acquisition unit, a determination unit, and a conversion unit. The acquisition unit acquires from a read image including a machine-readable code at least one of a position of the machine-readable code and character information included in the machine-readable code. The determination unit determines, based on the information acquired by the acquisition unit, a conversion method for a character code included in the machine-readable code. The conversion unit performs conversion of the character code in accordance with the conversion method determined by the determination unit.

BRIEF DESCRIPTION OF THE DRAWINGS

Exemplary embodiments of the present invention will be described in detail based on the following figures, wherein:

FIG. 3 is a diagram illustrating an example of the data configuration of conversion information stored in a conversion information storage unit according to the first exemplary embodiment;

DETAILED DESCRIPTION

Hereinafter, exemplary embodiments of the present invention will be explained with reference to the drawings.

First Exemplary Embodiment

Figure 1:
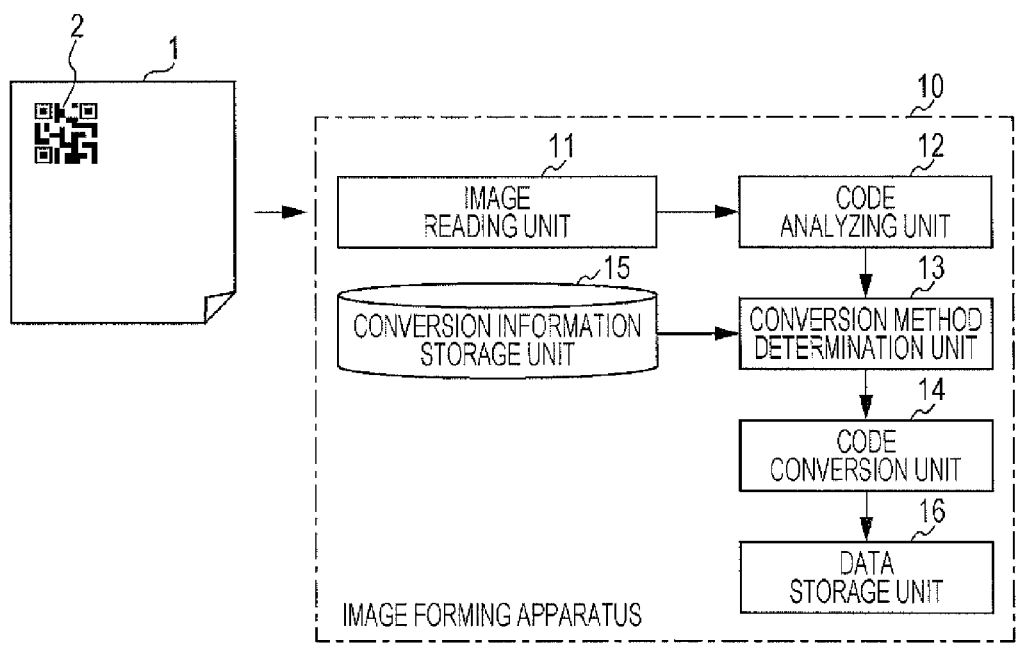
FIG. 1 is a block diagram illustrating an image forming apparatus as an image processing apparatus according to an exemplary embodiment of the present invention.
Figure 2:
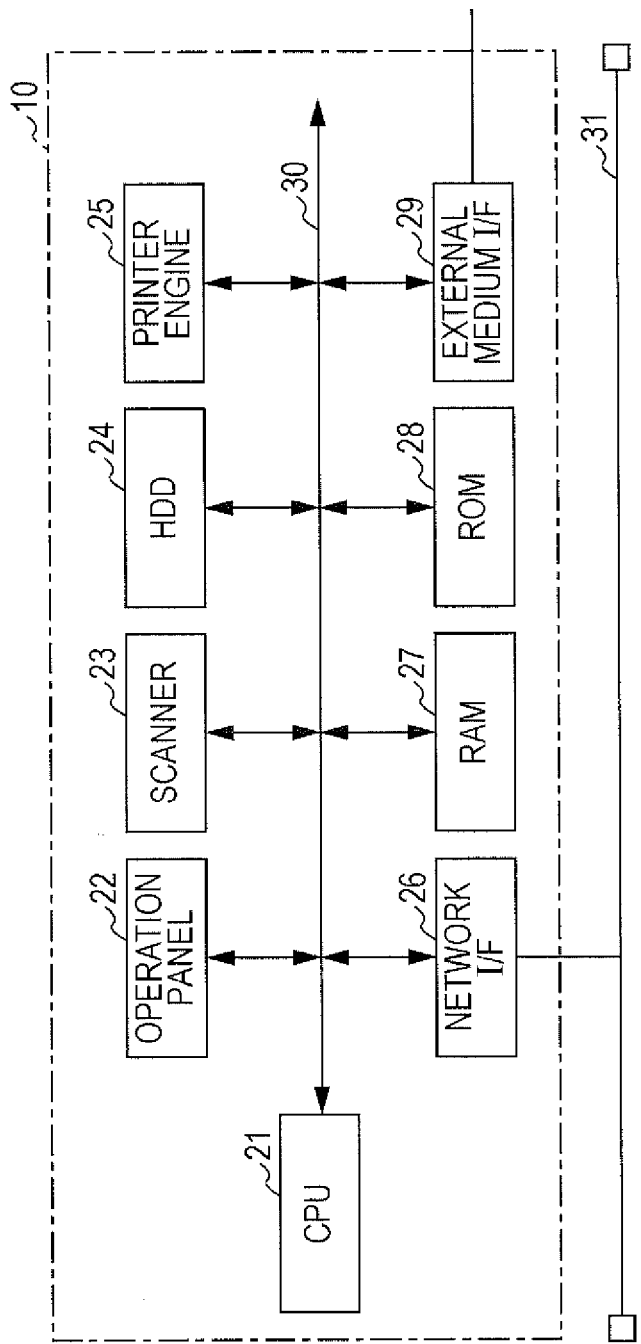
FIG. 2 is a hardware configuration diagram of the image forming apparatus according to a first exemplary embodiment.

FIG. 1 is a block diagram illustrating an image forming apparatus 10 as an image processing apparatus according to an exemplary embodiment of the present invention. FIG. 2 is a hardware configuration diagram of the image forming apparatus 10 according to the first exemplary embodiment.

The image forming apparatus 10 is a multifunction apparatus having various functions, such as a scanner function, a copying function, and a filing function, and including a computer built therein. Referring to FIG. 2, a central processing unit (CPU) 21 controls operation of various mechanisms provided in the image forming apparatus 10, such as a scanner 23 and a printer engine 25, in accordance with a program stored in a read only memory (ROM) 28. An address data bus 30 is connected to various mechanisms to be controlled by the CPU 21 and performs data communication with those mechanisms. An operation panel 22 receives user instructions and displays information. The scanner 23 reads originals set by a user and accumulates the read originals as electronic data into a hard disk drive (HDD) 24 and the like. An electronic file of an electronic document read with the scanner 23 and the like are stored in the HDD 24. The printer engine 25 prints an image on output paper in accordance with an instruction from the control program executed by the CPU 21. A network interface (I/F) 26 is connected to a network 31 and is used when the image forming apparatus 10 transmits data generated from a machine-readable code, such as a QR code, and transmits/receives electronic mail, when the image forming apparatus 10 is accessed via a browser, and the like. A RAM 27 is used as a work memory at the time of execution of a program and a communication buffer at the time of transmission/reception of electronic data. Various programs related to control of the image forming apparatus 10, cipher for electronic data, and transmission/reception of electronic data are stored in the ROM 28. When the various programs are executed, individual components described later implement predetermined processing functions. An external medium interface (I/F) 29 is an interface with an external memory device (recording medium), such as a universal serial bus (USB) memory or a flash memory.

Referring back to FIG. 1, the image forming apparatus 10 according to the first exemplary embodiment includes an image reading unit 11, a code analyzing unit 12, a conversion method determination unit 13, a code conversion unit 14, a conversion information storage unit 15, and a data storage unit 16. Components which are not mentioned in the Detailed Description are not illustrated in FIG. 1. The image reading unit 11 is a reading unit which is implemented by the scanner 23. The image reading unit 11 reads an original 1 set on an original table of the scanner 23 and generates a read image. The original 1 used in the first exemplary embodiment includes a machine-readable code formed therein. The code analyzing unit 12 is provided as an acquisition unit to acquire machine-readable code information by analyzing the read image of the original 1. Machine-readable code information only needs to include at least one of information indicating the position of a machine-readable code in the original 1 and information indicating the type of data recorded in the machine-readable code. However, the machine-readable code information may also include the orientation (rotation angle), color, and the like of the machine-readable code formed in the original 1. The conversion method determination unit 13 is provided as a determination unit, and determines, based on the information acquired by the code analyzing unit 12, a conversion method for a character code included in a machine-readable code, that is, a conversion program to be used for code conversion. The code conversion unit 14 is provided as a conversion unit. The code conversion unit 14 performs conversion of the character code in accordance with the conversion method determined by the conversion method determination unit 13, that is, converts data recorded in a machine-readable code using a predetermined character code into an output character code by executing the determined conversion program, creates a file of the converted data, and stores the file in the data storage unit 16.

A "machine-readable code" mentioned in the first exemplary embodiment represents an image code which is formed in a medium, such as an original, and which is readable by the image forming apparatus 10. The term "image code" may be used for the same meaning as a "barcode", which may be a general barcode as a one-dimensional symbol, a QR code which is a representative of a two-dimensional symbol (two-dimensional code), or the like. In the first exemplary embodiment, unless otherwise noted, a QR code will be explained as an example of a machine-readable code.

Furthermore, originals to be read by the image forming apparatus 10 according to the first exemplary embodiment have predetermined formats used by users. Therefore, the types of the originals are roughly limited. By identifying the type of an original, it is possible to identify a character code of data recorded in a QR code formed in the original and identify into which character code the data is to be converted for outputting. In the first exemplary embodiment, it is possible to identify the type of an original, more strictly speaking, a character code of data recorded in a QR code formed in the original, by referring to the position and orientation of the QR code in the original, the color of the entire or a part of the QR code such as a position detection pattern, the type of data recorded in the QR code, and the like, which are determined in advance according to the type of the original (more strictly speaking, the character code). Therefore, according to the first exemplary embodiment, in order to identify the type of an original, by analyzing a read image of the original, machine-readable code information (hereinafter, may also be referred to as "QR code information"), which includes information indicating the position and orientation of a QR code, information indicating the type of data recorded in the QR code, and the like, is acquired. Then, the type of the original is identified based on the acquired QR code information, a character code of the data recorded in the QR code and an output character code for outputting the data are obtained, and the character code of the data recorded in the QR code is converted into the output character code by using a conversion program which matches the character codes before and after conversion. It is assumed that a character code designated by a guest who prepares an original is used as an output character code. However, the output character code is not limited to this.

As an item of information for assisting decoding, a symbol of a QR code includes a mode indicator indicating the type of data written in the QR code (alphanumeric data, binary data, Chinese character data, etc.). In the first exemplary embodiment, the type of the data recorded in the QR code formed in the original 1 is identified by referring to the mode indicator.

FIG. 3 is a diagram illustrating an example of the data configuration of conversion information stored in the conversion information storage unit 15 according to the first exemplary embodiment. In FIG. 3, conversion information in which a recorded character code, an output character code, and program information are associated with each other is illustrated in association with conversion method identification information. The conversion method identification information is used for identifying a conversion program to be used for conversion of a character code, and is compared with QR code information acquired by the code analyzing unit 12. The recorded character code illustrates a character code of data recorded in a QR code. The output character code illustrates a character code into which data recorded in a QR code is to be converted for outputting. The program information identifies a conversion program to be used for converting a character code specified as a recorded character code into a character code specified as an output character code. In the program information, information (a folder name or a program name) indicating a storage destination of a conversion program may be set or conversion program data itself may be stored.

The position indicated in the conversion method identification information illustrated in FIG. 3 is information indicating the printing position of a QR code in an original and may be expressed by two-dimensional coordinates in the first exemplary embodiment. For example, let the upper left corner of a read original be defined as the origin (0, 0). By analyzing the read image of the original, position coordinates of the upper left corner and the center of the QR code are extracted as a printing position of the QR code. Furthermore, the orientation represents the orientation of the QR code printed in the original. The orientation may be referred to as a rotation angle or tilt. For example, the orientation may be expressed by an angle tilted with respect to the vertical direction of the original. In the first exemplary embodiment, it is unnecessary to strictly detect the position and orientation of a QR code. For example, in the case of orientation, a range from 38 degrees to 42 degrees may be specified, without strictly specifying 40 degrees, and set in conversion method identification information. The type represents a mode obtained by reading information for auxiliary control recorded in a QR code. In the first exemplary embodiment, it is only necessary to read at least a mode from a QR code. However, other types of information, such as a model number or an error correction level, may also be read as information included in conversion method identification information.

In the first exemplary embodiment, it is only necessary to uniquely identify program information on the basis of the relationship between conversion method identification information and QR code information. The recorded character code and the output character code are data items added for the convenience of explanation, and are therefore not necessarily included in conversion information.

The components 11 to 14 in the image forming apparatus 10 are implemented by cooperative operation between the computer provided in the image forming apparatus 10 and a program operating on the CPU 21 provided in the computer. Furthermore, the storage units 15 and 16 are implemented by the HDD 24 provided in the image forming apparatus 10. Alternatively, the RAM 27 or an external storage unit may be used via a network.

Furthermore, a program used in the first exemplary embodiment is able to not only be provided by a communication unit but also be stored in a computer-readable recording medium, such as a compact disk read-only memory (CD-ROM) or a digital versatile disk read only memory (DVD-ROM) and provided. A program provided by the communication unit or the recording medium is installed into the computer, and various types of processing are implemented when the CPU of the computer sequentially executes the program.

The first exemplary embodiment is characterized in that data recorded in a QR code may be converted into an output character code in accordance with the type of an original, without including information identifying a character code at the time of outputting in a QR code or causing a user to input and designate character codes before and after conversion. A data conversion process according to the first exemplary embodiment for converting data recorded in a QR code using a predetermined character code into an output character code will be explained below with reference to a flowchart illustrated in FIG. 4. Hereinafter, for convenience, a case where only one QR code is printed as a machine-readable code in an original will be explained.

When the original 1 including a QR code as a data conversion target formed therein is set at the scanner 23 and an instruction for reading the original 1 is issued, the image reading unit 11 reads the original 1 to generate a read image (step 110). The code analyzing unit 12 analyzes the read image to detect a QR code in the original 1, and acquires the position of the QR code. The code analyzing unit 12 also analyzes an image of the detected QR code to acquire information of the orientation, color arrangement, the type of data, and the like, generates QR code information including the acquired information, and stores the generated QR code information into a predetermined storage region, such as a work memory region of the RAM 27 or the HDD 24 (step 120).

Then, the conversion method determination unit 13 compares the QR code information generated by the code analyzing unit 12 with conversion method identification information set in the conversion information storage unit 15 to extract conversion method identification information which matches the QR code information. In other words, the conversion method determination unit 13 identifies the type of the original read by the scanner 23. If the contents of the QR code information match the contents of the settings of plural pieces of conversion method identification information, the conversion method determination unit 13 performs processing for extracting only one piece of conversion method identification information, for example, by selecting conversion method identification information registered on the upper side or selecting conversion method identification information which have a large number of corresponding items. The conversion method determination unit 13 determines a character code conversion method by identifying conversion method identification information which matches the QR code information as described above and selecting program information corresponding to the identified conversion method identification information (step 130). In other words, the conversion method determination unit 13 determines a character code conversion method corresponding to the type of the original read by the scanner 23.

When program information to be used for character code conversion is determined, the code conversion unit 14 converts the data recorded in the QR code using the predetermined character code into an output character code by acquiring a conversion program by referring to the program information and executing the acquired conversion program (step 140). Then, the data which has been subjected to character code conversion is stored into the data storage unit 16 in a file format (step 150).

As is clear from the data setting example illustrated in FIG. 3, for example, when a QR code extracted from a read image of an original is located at a position (x1, y1) and the type of data recorded in the QR code is a binary mode, a character code of the data recorded in the QR code is UTF-8 and the data should be converted into UTF-16 for outputting. Therefore, the code conversion unit 14 performs conversion of the character code of the data by executing a conversion program for converting UTF-8 data into UTF-16 data. Furthermore, as is clear from FIG. 3, when the type of data recorded in a QR code extracted from a read image of an original is a Chinese character mode, a character code of the data recorded in the QR code is SHIFT-JIS, regardless of the position of the QR code, and therefore the data should be converted into UTF-16 data for outputting. Thus, the code conversion unit 14 performs conversion of the character code of the data by executing a conversion program for converting SHIFT-JIS data into UTF-16 data. Furthermore, as is clear from FIG. 3, when the type of data recorded in a QR code is a binary mode, although it is unclear with which character code the data is recorded, if the QR code is formed at a position (x2, y2) and is tilted 10 degrees, the character code of the data recorded in the QR code is determined to be BIG5, and therefore the data should be converted into ECU-JP data for outputting.

In the explanation provided above, for convenience, the case where only one QR code is printed in an original has been explained by way of example. In the case where plural QR codes are printed, the above-mentioned code conversion process may be performed for each of the QR codes. In this case, the code analyzing unit 12 may analyze all the QR codes. Alternatively, plural code analyzing units 12 associated with the individual QR codes may be provided in the image forming apparatus 10.

In the first exemplary embodiment, a QR code has been explained as an example of a machine-readable code. However, a machine-readable code of a different type may be formed in an original or multiple types of machine-readable codes may coexist in an original.

Second Exemplary Embodiment

A second exemplary embodiment is characterized in that an original including a first machine-readable code for identification of a character code conversion method and a second machine-readable code including data recorded in a predetermined character code that are formed separately is used. In the first exemplary embodiment, a single machine-readable code is used for identification of a character code conversion method and for data recording. However, in the second exemplary embodiment, machine-readable codes are separately formed for the individual purposes, such as identification of a character code conversion method and recording of data.

Figure 5:
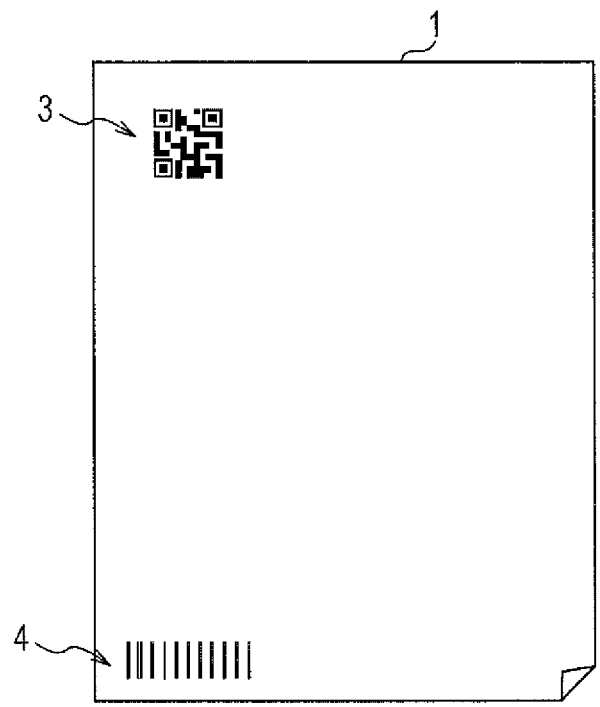
FIG. 5 is a conceptual diagram illustrating an original to be read in a second exemplary embodiment.

FIG. 5 is a conceptual diagram illustrating an original to be read in the second exemplary embodiment. In the second exemplary embodiment, a determination as to whether a machine-readable code is for data recording or for identification of a character code conversion method is performed on the basis of the type of the machine-readable code. In the example illustrated in FIG. 5, a QR code 3 is used for data recording, and a one-dimensional barcode 4 is used for identification of a character code conversion method. However, the case illustrated in FIG. 5 is merely an example and the original 1 is not necessarily arranged as illustrated in this example. It is necessary to understand in advance a function to be associated with each machine-readable code to create the original 1.

Figure 4:
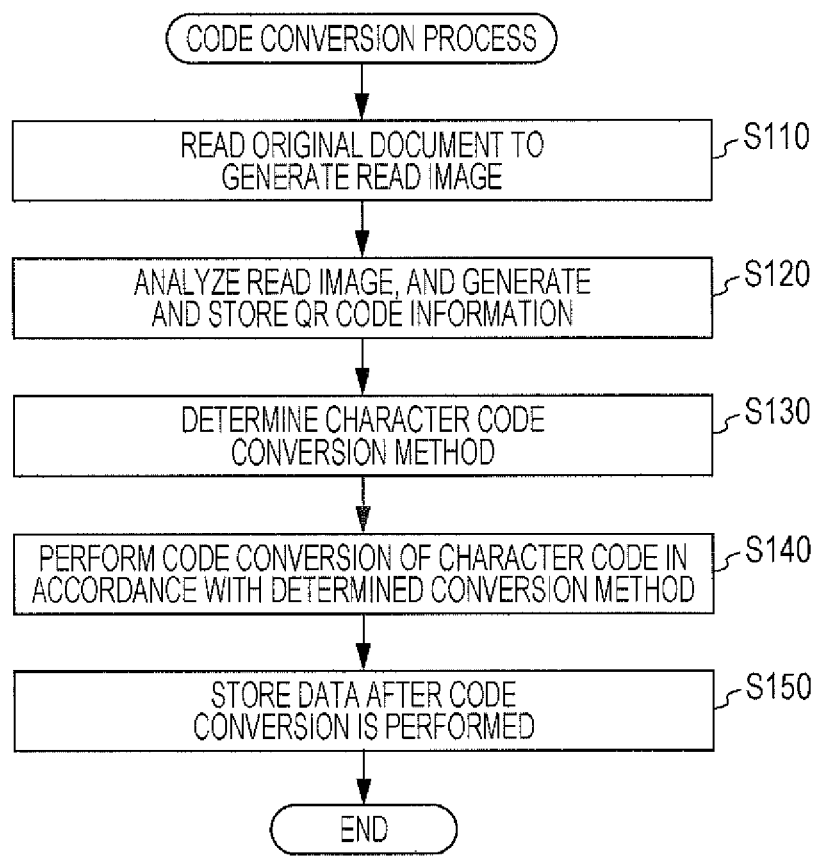
FIG. 4 is a flowchart illustrating a data conversion process according to the first exemplary embodiment.

Next, a data conversion process according to the second exemplary embodiment will be explained. The procedure of the process according to the second exemplary embodiment is the same as that according to the first exemplary embodiment. In the second exemplary embodiment, however, two types of machine-readable codes are used, and therefore the processing of step 120 in the flowchart illustrated in FIG. 4 is slightly different.

That is, in step 120, the code analyzing unit 12 detects the QR code 3 and the barcode 4 in the original by analyzing the read image generated by the image reading unit 11, and acquires QR code information from the position, orientation, color arrangement, and the like of the detected barcode 4. Plural code analyzing units 12 may be provided in association with the first machine-readable code for identification of a character code conversion method and the second machine-readable code including data recorded therein.

The subsequent processing may be the same as that according to the first exemplary embodiment. The conversion method determination unit 13 identifies program information corresponding to the QR code information generated by the code analyzing unit 12 (step 130), and the code conversion unit 14 converts the data recorded in the QR code 3 into an output character code by acquiring a conversion program by referring to the program information and executing the acquired conversion program, and stores the data converted into the output character code (steps 140 and 150).

In the second exemplary embodiment, the barcode 4 is used as the first machine-readable code for identification of a character code conversion method and the QR code 3 is used as the second machine-readable code for data recording. However, a combination of machine-readable codes different from the example described in the second exemplary embodiment may be used as the first machine-readable code and the second machine-readable code as long as they are of predetermined types and different from each other. Furthermore, plural pairs of first machine-readable code and second machine-readable code may be formed in an original. The first machine-readable code for identification of a character code conversion method may be used for recording additional information, such as the date and the name of a case.

Third Exemplary Embodiment

In the second exemplary embodiment, a determination as to whether a machine-readable code is the first machine-readable code for identification of a character code conversion method or the second machine-readable code for data recording is performed on the basis of the type of the machine-readable code. The third exemplary embodiment is characterized in that such a determination is performed on the basis of the position in an original where a machine-readable code is formed.

Figure 6:
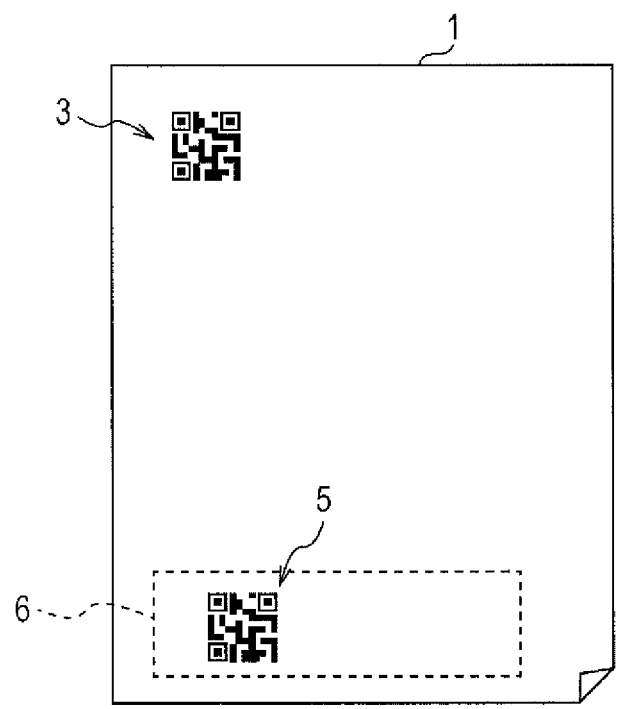
FIG. 6 is a conceptual diagram illustrating an original to be read in a third exemplary embodiment.

FIG. 6 is a conceptual diagram illustrating an original to be read in the third exemplary embodiment. In the third exemplary embodiment, each of a code for data recording and a code for identification of a character code conversion method is formed as a QR code. A QR code 5 formed in a predetermined change method specification region 6 in the original 1 is determined to be a first machine-readable code for identification of a character code conversion method, and a QR code 3 formed outside the change method specification region 6 is determined to be a second machine-readable code for data recording.

Next, a data conversion process according to the third exemplary embodiment will be explained. The procedure of the process according to the third exemplary embodiment is the same as that according to the first exemplary embodiment. In the third exemplary embodiment, however, the function of a machine-readable code varies according to the position where the machine-readable code is formed, and therefore the processing of step 120 in the flowchart illustrated in FIG. 4 is slightly different.

That is, in step 120, the code analyzing unit 12 detects the QR codes 3 and 5 in the original 1 by analyzing the read image generated by the image reading unit 11. Then, the positions where the QR codes 3 and 5 are formed are identified, and it is determined whether a QR code is formed in the change method specification region 6. As illustrated in FIG. 6, when the QR code 5 exists in the change method specification region 6, the QR code 5 is determined to be for identification of a character code conversion method. Then, the code analyzing unit 12 analyzes the read image of the original 1 to acquire QR code information on the basis of the position, orientation, and the like of the QR code 5. The type of data may be read from the QR code 5. Alternatively, as in the first exemplary embodiment, the type of the data may be read from the QR code 3 for data recording. Furthermore, plural code analyzing units 12 may be provided in association with the first machine-readable code for identification of a character code conversion method and the second machine-readable code including data recorded therein. The subsequent processing may be the same as that according to the first or second exemplary embodiment, and therefore explanation for the subsequent processing will be omitted.

In the third exemplary embodiment, each of the first machine-readable code for identification of a character code conversion method and the second machine-readable code for data recording is formed as a QR code. However, a combination of machine-readable codes different from the example described in the third exemplary embodiment, such as machine-readable codes of different types, may be used. Furthermore, by determining in advance the correspondence between the position where the second machine-readable code for data recording is formed and the change method specification region 6, plural pairs of first machine-readable code and second machine-readable code may be formed in an original.

Furthermore, in the third exemplary embodiment, the change method specification region 6 is determined in advance and a region other than the change method specification region 6 is defined as a region where the machine-readable code for data recording is formed. However, the change method specification region 6 may be defined as a region where the machine-readable code for data recording is formed. The region for data recording and the change method specification region 6 may be separately set in a clear manner. Furthermore, the region for data recording and the change method specification region 6 may overlap. By forming a machine-readable code in the overlapping region, the machine-readable code may be used as a code for identification of a character code conversion method and for data recording, as in the first exemplary embodiment.

In each of the foregoing exemplary embodiments, the case where an image forming apparatus is used as an information processing apparatus has been explained as an example. However, for example, an information processing apparatus, such as a personal computer, which is not provided with a scanner function, may be caused to acquire an image of an original read with a scanner and to perform the above-described data conversion process.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an acquisition unit that acquires from a read image including a machine-readable code at least one of a position of the machine-readable code and character information included in the machine-readable code;
a determination unit that determines, based on the information acquired by the acquisition unit, a conversion method for a character code included in the machine-readable code;
a conversion unit that performs conversion of the character code in accordance with the conversion method determined by the determination unit; and
a storage unit that stores conversion method identification information for each of a plurality of character codes, each character code being stored in association with program information identifying a conversion program to be used for conversion of the plurality of character codes, respectively,
the conversion method identification information including at least one of information indicating a position of the machine-readable code in image information and information indicating a type of data recorded in the machine-readable code in association with the program information identifying a conversion program to be used for conversion of the character code,
wherein the conversion unit converts the data recorded in the machine-readable code into an output character code by executing the conversion program which is associated with the conversion method identification information corresponding to machine-readable code information acquired by the acquisition unit.

2. The image processing apparatus according to claim 1, wherein a first machine-readable code included in image information for identification of a character code conversion method and a second machine-readable code including data recorded in a predetermined character code are formed separately in the image information, and
wherein the acquisition unit acquires machine-readable code information including at least one of a position of the first machine-readable code and a type of the data recorded in the second machine-readable code from the image information.

3. The image processing apparatus according to claim 2, wherein the acquisition unit identifies a machine-readable code corresponding to a predetermined type in the image information as the first machine-readable code.

4. The image processing apparatus according to claim 2, wherein the acquisition unit identifies a machine-readable code formed in a predetermined conversion method specification region in a medium as the first machine-readable code.

5. An image processing method comprising:
acquiring from a read image including a machine-readable code at least one of a position of the machine-readable code and character information included in the machine-readable code;
determining, based on the acquired information, a conversion method for a character code included in the machine-readable code;
performing conversion of the character code in accordance with the determined conversion method;
storing conversion method identification information for each of a plurality of character codes, each character code being stored in association with program information identifying a conversion program to be used for conversion of the plurality of character codes, respectively,
the conversion method identification information including at least one of information indicating a position of the machine-readable code in image information and information indicating a type of data recorded in the machine-readable code in association with the program information identifying a conversion program to be used for conversion of the character code; and
converting the data recorded in the machine-readable code into an output character code by executing the conversion program which is associated with the conversion method identification information corresponding to machine-readable code information acquired.

6. A non-transitory computer readable medium storing a program causing a computer to execute a process for image processing, the process comprising:
acquiring from a read image including a machine-readable code at least one of a position of the machine-readable code and character information included in the machine-readable code;
determining, based on the acquired information, a conversion method for a character code included in the machine-readable code;
performing conversion of the character code in accordance with the determined conversion method;
storing conversion method identification information for each of a plurality of character codes, each character code being stored in association with program information identifying a conversion program to be used for conversion of the plurality of character codes, respectively,
the conversion method identification information including at least one of information indicating a position of the machine-readable code in image information and information indicating a type of data recorded in the machine-readable code in association with the program information identifying a conversion program to be used for conversion of the character code; and
converting the data recorded in the machine-readable code into an output character code by executing the conversion program which is associated with the conversion method identification information corresponding to machine-readable code information acquired.

* * * * *